US012031610B2

(12) United States Patent
Enger et al.

(10) Patent No.: US 12,031,610 B2
(45) Date of Patent: Jul. 9, 2024

(54) CLAMPING CABLE LOCKOUT

(71) Applicant: Brady Worldwide, Inc., Milwaukee, WI (US)

(72) Inventors: Andrew Enger, Muskego, WI (US); Gene Gladkov, Muskego, WI (US); Benjamin Caccese, Oconomowoc, WI (US); Carlos Soria, Milwaukee, WI (US)

(73) Assignee: Brady Worldwide, Inc., Milwaukee, WI (US)

( * ) Notice: Subject to any disclaimer, the term of this patent is extended or adjusted under 35 U.S.C. 154(b) by 359 days.

(21) Appl. No.: 17/559,532

(22) Filed: Dec. 22, 2021

(65) Prior Publication Data

US 2023/0193978 A1 Jun. 22, 2023

(51) Int. Cl.
*F16G 11/14* (2006.01)
*B25B 5/06* (2006.01)
(Continued)

(52) U.S. Cl.
CPC .............. *F16G 11/14* (2013.01); *B25B 5/068* (2013.01); *E05B 13/002* (2013.01);
(Continued)

(58) Field of Classification Search
CPC .... F16G 11/14; F16G 11/106; E05B 73/0005; E05B 67/003; E05B 67/02; E05B 67/38; E05B 67/383; E05B 13/001; E05B 13/002; E05B 65/0007; F16K 35/10; B25B 5/00; B25B 5/02; B25B 5/068; B25B 5/085; B25B 5/101
(Continued)

(56) References Cited

U.S. PATENT DOCUMENTS 4,113,291 A * 9/1978 Cameron .............. E05B 67/383
292/281
5,222,420 A 6/1993 Sorensen et al.
(Continued)

FOREIGN PATENT DOCUMENTS

BR 202018003573 U2 9/2019
GB 2177058 A 1/1987

OTHER PUBLICATIONS

European Patent Office, Extended European Search Report, Application No. 22212245.9, Apr. 18, 2023, 5 pages.

*Primary Examiner* — Christine M Mills
*Assistant Examiner* — Peter H Watson
(74) *Attorney, Agent, or Firm* — Quarles & Brady LLP

(57) ABSTRACT

A clamping cable lockout device includes a pair of clamp jaws that are supported by a body and an arm movable relative thereto. A jaw release permits a one-way ratcheting of the arm relative to the body to reduce the distance between the jaws unless the jaw release is actuated to a release position. The device also has a cable having an end secured to the body and a free end. A cable securing mechanism is supported by the body and has a lockable cover selectively permitting access thereto such that, when the cable securing mechanism receives the free end of the cable and the cover is closed, a closed loop by the cable which can only be made smaller. The lockable cover has a blocking arm that, when lockable cover is in the closed position, prevents actuation of the jaw release to the release position.

18 Claims, 15 Drawing Sheets

(51) Int. Cl.
  E05B 13/00 (2006.01)
  E05B 67/38 (2006.01)
  F16G 11/10 (2006.01)
  F16K 35/10 (2006.01)
(52) U.S. Cl.
  CPC .......... *E05B 67/383* (2013.01); *F16G 11/106* (2013.01); *F16K 35/10* (2013.01)
(58) Field of Classification Search
  USPC .................................................. 269/3, 6, 95
  See application file for complete search history.

(56) References Cited

U.S. PATENT DOCUMENTS

| | | | |
|---|---|---|---|
| 5,415,017 A | 5/1995 | Benda et al. | |
| 6,112,560 A | 9/2000 | Mabee | |
| 6,412,767 B1 | 7/2002 | Beckmann et al. | |
| 7,272,962 B2 | 9/2007 | Benda et al. | |
| 7,293,438 B2 | 11/2007 | Benda | |
| 7,581,420 B2 | 9/2009 | Manthe et al. | |
| 7,641,183 B2 | 1/2010 | Fuller et al. | |
| 9,105,168 B2 | 8/2015 | Shute et al. | |
| 9,184,573 B1 | 11/2015 | Jonas et al. | |
| 9,243,431 B1 | 1/2016 | DeLeon | |
| 9,388,606 B2 | 7/2016 | Garthe et al. | |
| 10,352,068 B2 | 7/2019 | Hollis | |
| 2006/0283215 A1 | 12/2006 | Manthe et al. | |
| 2007/0240766 A1* | 10/2007 | Brojanac | F16K 35/10 137/385 |
| 2007/0246874 A1* | 10/2007 | Fuller | B25B 5/068 269/6 |
| 2008/0302146 A1 | 12/2008 | Cannon | |
| 2009/0235704 A1* | 9/2009 | Quach | E05B 13/002 70/416 |
| 2009/0266119 A1* | 10/2009 | Brojanac | F16K 35/10 70/174 |
| 2012/0151729 A1* | 6/2012 | Chen | B25B 27/0035 29/270 |
| 2012/0227446 A1 | 9/2012 | Shute et al. | |
| 2013/0219828 A1 | 8/2013 | Canaday et al. | |
| 2015/0075648 A1* | 3/2015 | Rohde | F16K 35/10 137/385 |
| 2015/0315822 A1* | 11/2015 | Garthe | E05B 73/0005 70/15 |
| 2020/0347639 A1* | 11/2020 | Mano | E05B 15/02 |
| 2021/0381277 A1 | 12/2021 | Enger et al. | |

* cited by examiner

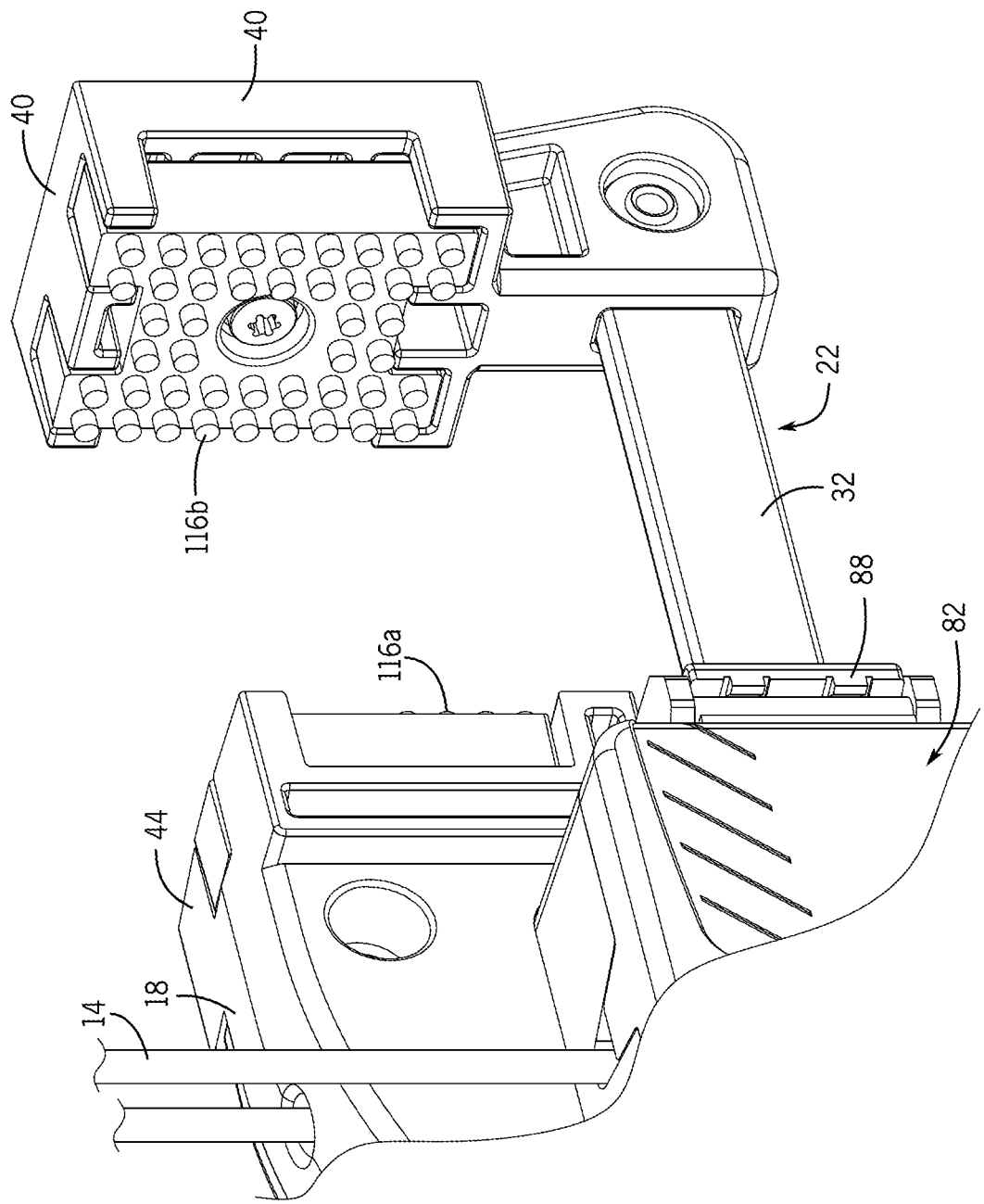

CLAMPING CABLE LOCKOUT

CROSS-REFERENCE TO RELATED APPLICATIONS

Not applicable.

TECHNICAL FIELD

This disclosure relates to a clamping cable lockout device that is used to secure a control such as, for example, a valve handle.

BACKGROUND

Lockout devices are conventionally used to secure controls or energy isolation points during the maintenance or servicing of equipment. For instance, if a particular control or energy isolation point needs to be turned off to perform maintenance on equipment, then a lockout device may be installed on the control or the energy isolation point to prevent others from mistakenly turning that control back on until the work is complete. Such lockout devices often include the ability for multiple users to lockout a control simultaneously, for example, by permitting each user to attach their own separate padlock to the lockout device to secure the lockout device in place on the control. In such case, the lockout device cannot be removed and the control operated until all of the individual padlocks are removed from the lockout device.

One type of lockout device is a cable lockout device. These cable lockout devices are so named because they include a cable as part of the lockout device in which that cable can be run through the control and formed into a closed loop, with the closed loop preventing the operation of that control while the cable lockout device remains in place. An example of a cable lockout device can be found, for example, in U.S. Pat. No. 7,293,438 to Brady Worldwide, Inc., which is incorporated by reference herein. Such cable lockout devices can be well suited for locking out the rotatable spoked handles of valve controls, for instance, but may be used in other contexts as well.

SUMMARY

Because such cable lockout devices typically involve forming a closed loop to secure a control or an energy isolation point, they typically involve some variety of mechanism for securing the ends of the cable or a length of the cable in the central body of the lockout device. Many cable lockout devices pre-anchor one end of the cable in or to a housing with the free end of the cable being available for routing through the control to be locked out before being returned to the housing where that free end (or some portion of its length) is secured. Accordingly, these cable lockout devices often have some clamping or other securement mechanism for temporarily holding that free end or a length of the cable in place, which clamping or securement mechanism also needs itself to be lockable to prevent an unintended release of the cable. Beyond this, while many cable lockout devices have a structure for forming and securing a closed cable loop, it may also be valuable to have a portion of the cable lockout device secured to part of the control or surrounding environment such that the control is secured and rendered inoperable when the cable lockout device is secured. However, this might require two separately lockable mechanisms which can complicate use and operation.

Disclosed herein is an improved clamping cable lockout device. This clamping cable lockout device incorporates both a clamping mechanism and a cable loop forming mechanism which are both separately operable, and which can be locked out at a unitary securement point simultaneously (which unitary securement point may also be capable of receiving various separate padlocks to provide multi-user lockout capability). This dual-lockout ability can be provided by virtue of a lockable door or cover which has the ability to simultaneously both cover a cable securement mechanism such as a pair of griping cleats and provides a blocking arm as part of the door or cover that, based on the opened or closed state of the door or cover, can permit or block release of the clamping jaws via a jaw release for the clamping mechanism. Even when locked out or secured at the unitary securement point by restrain of the lockable cover, however, the clamping mechanism may be operable in a one-way fashion to bring the jaws together (but not allow their separation) and the cable loop forming mechanism may permit for the closed loop to be made smaller (but not enlarged).

Still further, disclosed herein is a clamping mechanism in which the clamping pads can be re-oriented for mounting at various positions and/or replaced with an alternative type of pad.

According to one aspect, a clamping cable lockout device includes a housing including a body and a moveable arm that is movable relative to the body of the housing. A pair of clamp jaws is supported by the body and the movable arm. The pair of clamp jaws are positionable with respect to one another to define a distance between the jaws. A jaw release of the device permits a one-way ratcheting or movement of the moveable arm relative to the body to reduce the distance between the pair of clamp jaws, unless the jaw release is actuated to a release position in which the pair of clamp jaws are separable from one another. The device also includes a cable that has an end secured to the body and a free end. Apart from the end of the cable secured to the body, the device includes a cable securing mechanism that is supported by the body. The cable securing mechanism has a lockable cover selectively permitting access to the cable securing mechanism such that, when the cable securing mechanism receives the free end of the cable and when the cover is closed, a closed loop is formed between the end of the cable secured to the body and the free end of the cable received in the cable securing mechanism. Moreover, in such a position of the cover and free end of the cable, the free end is further moveable in the cable securing mechanism only in one direction to make the closed loop smaller while the cover is closed. Notably, the lockable cover has a blocking arm that, when lockable cover is in the closed position, prevents actuation of the jaw release to the release position in which the pair of clamp jaws are separable from one another.

In this way, when the lockable cover is secured in the closed position, the clamping cable lockout device can be held in a state in which it is only possible to further tighten the pair of clamping jaws by bringing them closer together and/or to reducing the size of the closed loop.

In some forms, the jaw release may include a rotatable cam. When the rotatable cam is rotated to actuate the jaw release to the release position, the rotatable cam may engage a jaw release plate that rotates within the body of the housing to permit the movable arm to travel in a direction in which the pair of clamp jaws are separable from one another. The rotatable cam and the jaw release plate may both be received inside the housing and the jaw release may further include a cam lever attached to the rotatable cam in which the cam lever is external to the housing. The cam lever may include a projection extending from the cam lever and the blocking arm of the lockable cover may be positioned to block the projection (and thereby the cam lever) from rotating when the lockable cover is closed. In some forms, the lockable cover may be hinged relative to the body of the housing on the side of the cable securing mechanism proximate the cam lever.

In some forms, the jaw release may be biased away from the release position.

In some forms, the cable securing mechanism may include a set of lock receiving openings configured to receive one or more locks in which, when the lockable cover is in the closed position and the one or more of the set of lock receiving openings receive the one or more locks, the lockable cover may not be able to be moved away from the closed position, thereby maintaining the blocking arm of the cover in a position that prevents the jaw release from being moved to the release position and further that prevents the cable to be disengaged from the cable securing mechanism to break the closed loop of the cable and that prevents the closed loop from being enlarged. In one form, the set of lock receiving openings may be received on a wall that extends away from the body and the lockable cover may include a slot. The wall providing the set of lock receiving openings may be received through the slot of the lockable cover when the lockable cover is closed such that a lock placed through one of the set of lock receiving openings would prevent the lockable cover from being moved out of the closed position.

In some forms, a cable pathway may extend through the cable securing mechanism and the cable securing mechanism may include at least one cleat biased to engage the cable when the cable is received through the cable pathway. The cable pathway may also extend between a pair of cleats (including the at least one cleat) biased to engage the cable when the cable is received through the cable pathway. The cleat(s) may be arranged to grip the cable when it is attempted to be pulled in one direction through the cable pathway so as to enlarge a closed loop but permit the cable to be pulled in a direction through the cable pathway in which the closed loop is made smaller in length.

In some forms, the body of the housing may include a handle and the clamping cable lockout device may further include a trigger displaceable relative to the body to effectuate a one-way ratcheting of the moveable arm relative to the body to draw the pair of clamping jaws closer to one another. To do this, the trigger may engage an arm advancement plate when the trigger is displaced in which the arm advancement plate engages the movable arm as the trigger is depressed in order to effectuate the one-way ratcheting of the moveable arm relative to the body. A movement of the arm advancement plate when the trigger is displaced may be made against a force of a biasing spring which force of the biasing spring returns the arm advancement plate after the trigger is released (thereby providing the ratcheting quality).

In some forms, the end of the cable secured to the body may be secured by way of a stop secured to the end of the cable engaging a cable opening in the housing undersized relative to the size of the stop. The cable opening may be large enough that the free end of the cable can pass through the cable opening and may be small enough that the stop secured to the end of the cable cannot pass through the cable opening. With such a structure, by moving the end of the cable having the stop away from the cable opening of the housing, the free end of the cable may be capable of being pulled out of the cable opening in the housing and such that the cable replaced with another cable. This may be help to provide different gauges of cable or to replace a cable that may be worn.

In some forms, one of the pair of clamping jaws may be mounted to the body and the other one of the pair of clamping jaws may be mounted to the movable arm. The pair of clamping jaws may include clamping pads that are removable from the body and the movable arm and, at least in some forms, the clamping pads may be selected from a group of pads including an elastomeric pad and a pad having teeth (although any one of a number of pads of different qualities could be used or replaced).

These and still other advantages of the invention will be apparent from the detailed description and drawings. What follows is merely a description of some preferred embodiments of the present invention. To assess the full scope of the invention the claims should be looked to as these preferred embodiments are not intended to be the only embodiments within the scope of the claims.

BRIEF DESCRIPTION OF THE DRAWINGS

FIGS. 13A and 13B is the cable lockout device of FIG. 1-11, but in which the first style of jaw pads (having metal teeth) have been removed and replaced with a different style of jaws (which are plastic or rubber) to demonstrate the modular nature of the jaws and the ability for them to be replaced.

DETAILED DESCRIPTION

Figure 1:
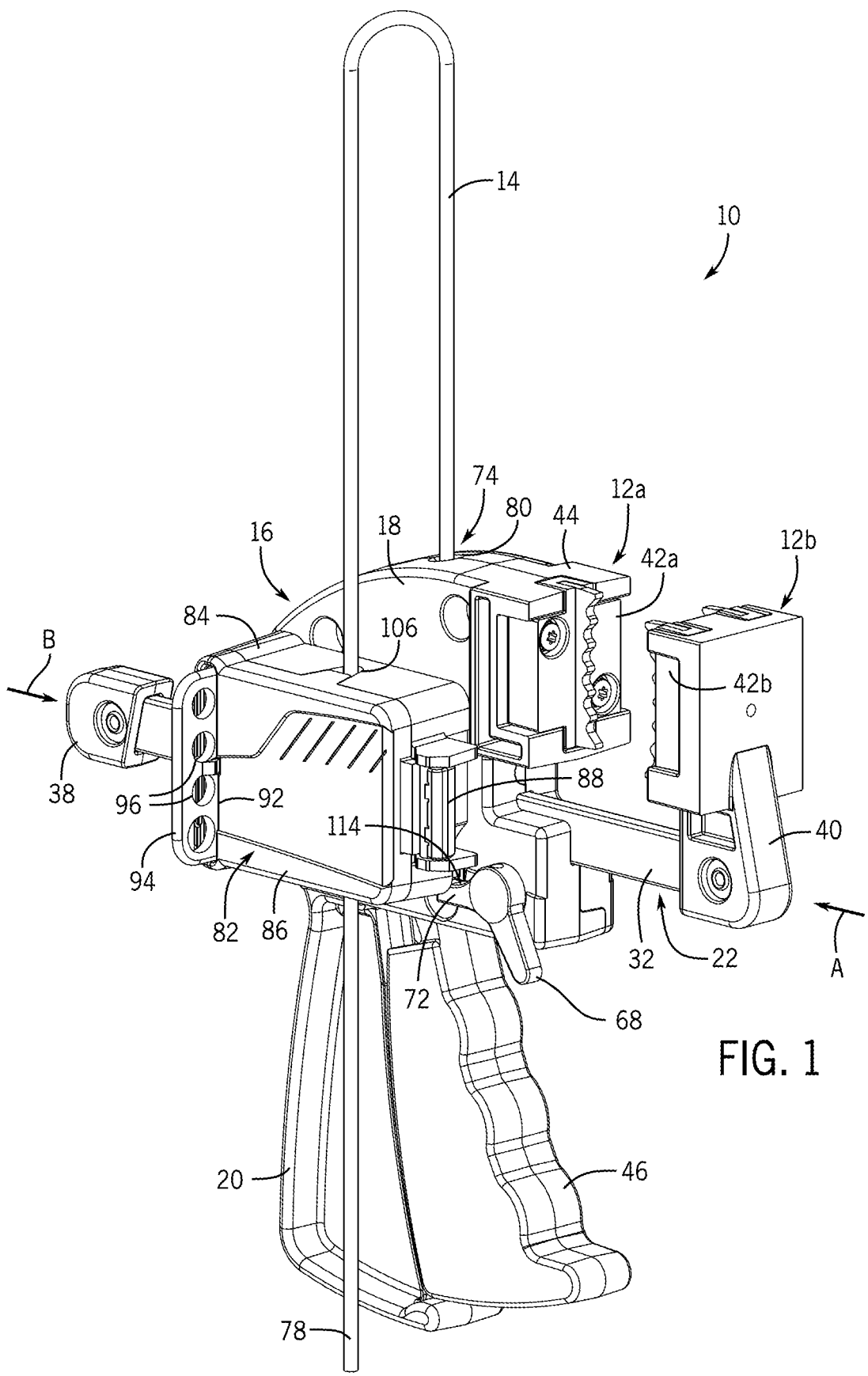
FIG. 1 is a front, left, top perspective view of a cable lockout device according to one aspect of the invention in which a cable is received in a cable securing mechanism supported on a clamping portion of the device in which the cable is received in the cable securing mechanism and a lockable cover of the cable securing mechanism is closed.
Figure 2:
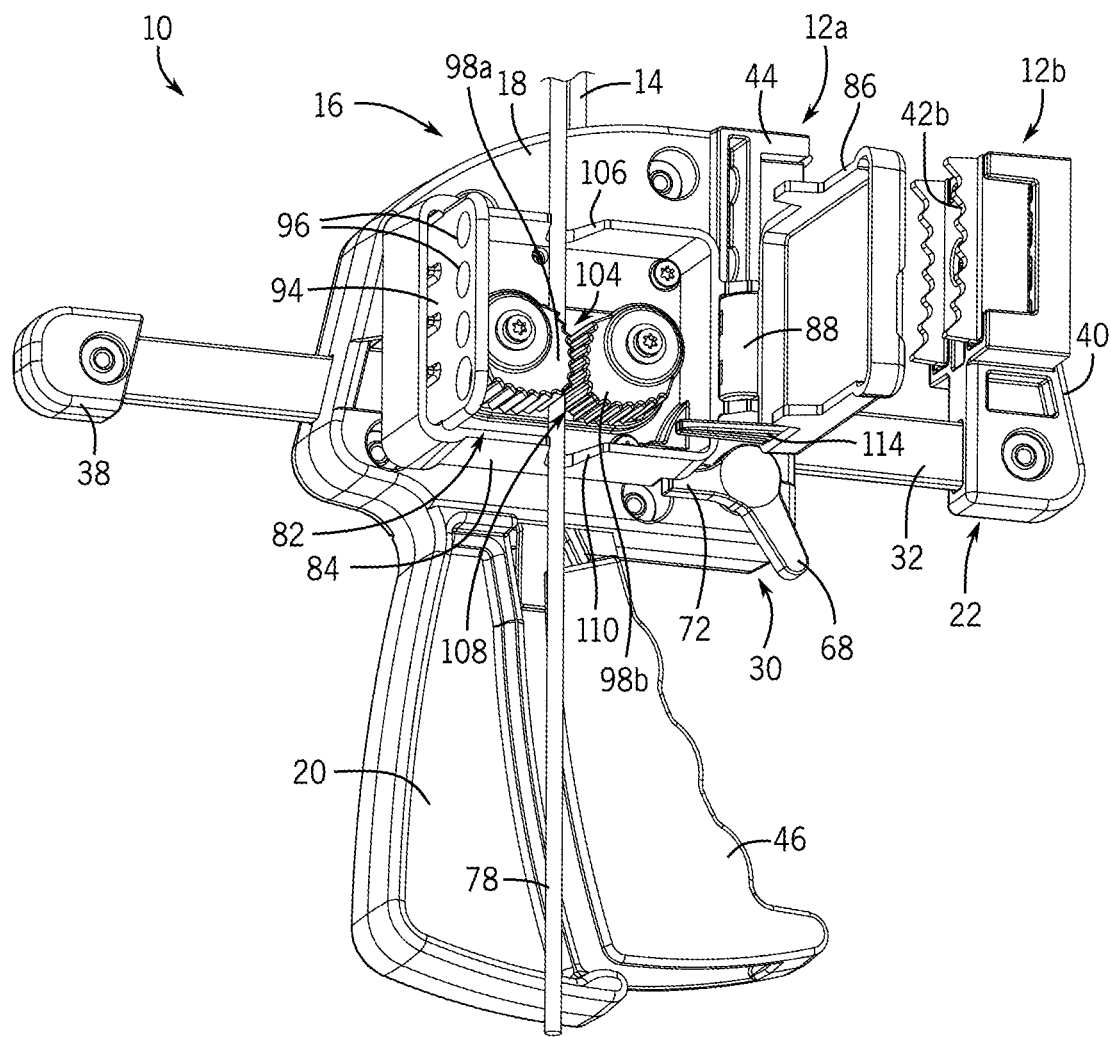
FIG. 2 is a rear, left, bottom perspective view of the cable lockout device of FIG. 1, but in which the cover of the cable securing mechanism is opened to show the cleated arrangement for engaging the cable.
Figure 3:
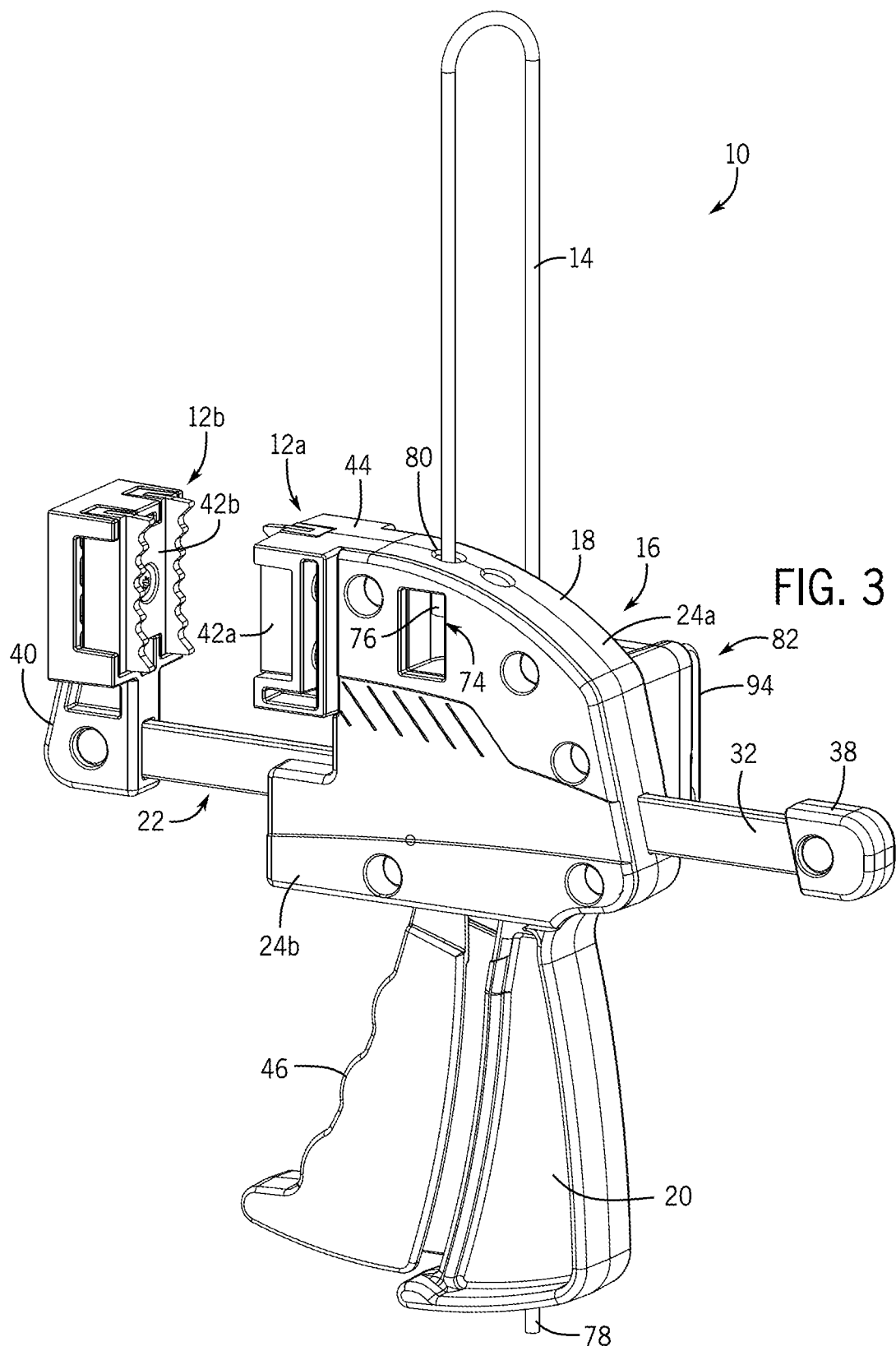
FIG. 3 is a top, right, rear perspective view of the cable lockout device of FIG. 1.

Referring first to FIGS. 1 through 3, a clamping cable lockout device 10 is illustrated that can be used to lockout valves or other controls. This clamping cable lockout device 10 can be used to both (1) clamp onto an object using a pair of clamping jaws 12a and 12b and (2) establish a closed loop using a cable 14 for securement around an object. As will be described in greater detail below, these two separate functional lockout mechanisms (i.e., the clamping jaws 12a and 12b and the cable 14) are integrated into this single lockout device 10 with the capability to be jointly "locked out" in such a way that the device 10 can only further be operated to further move the jaws closer together or to make the closed loop smaller until the device 10 is unlocked by opening a lockable cover or door. For ease in understanding operation, the various parts of the clamping mechanism will be described first, followed by the parts of the cable looping mechanism being described second. Then, the overall operation of the clamping cable lockout device 10 will be described in which the clamping mechanism and the cable looping mechanism are operated in parallel. Finally, some details will be provided about how the pads on the clamp jaws 12a and 12b can be reconfigured or replaced with a different style of pad.

A. Clamping Mechanism

Figure 4:
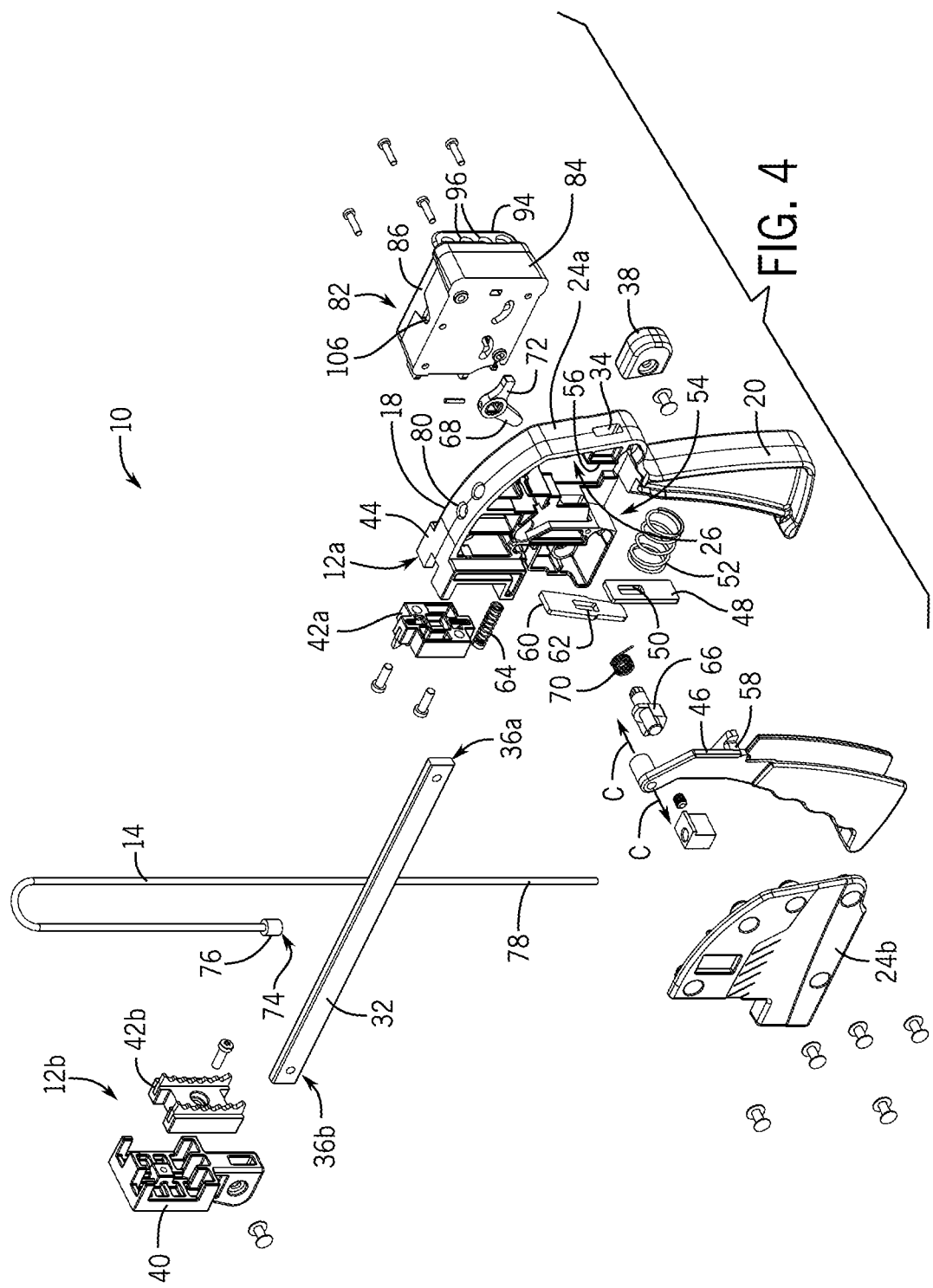
FIG. 4 is a rear, top, right exploded perspective view of the cable lockout device showing the various components of cable lockout device and, in particular, the clamping mechanism, but in which the subcomponents of the cable securing mechanism is not shown exploded.
Figure 5:
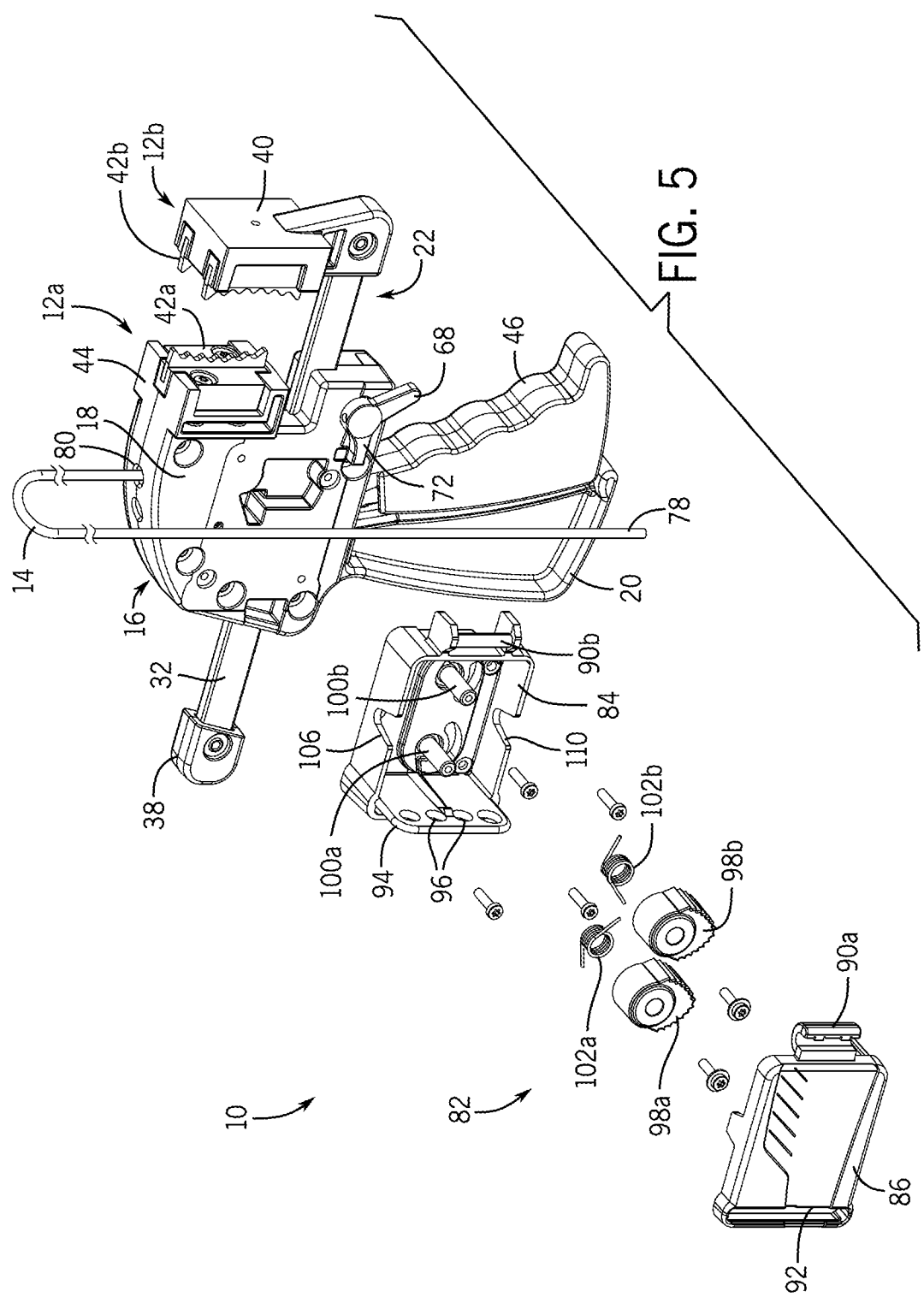
FIG. 5 is a front, left, top exploded view of just the cable securing mechanism apart from the rest of the cable lockout device.

In consideration of the clamping mechanism of the device 10 and with additional reference being made to FIG. 4, the clamping cable lockout device 10 includes a housing 16 having a body 18 with a handle 20 extending from the body 18 and further includes a movable arm 22 that is able to be moved relative to the body 18. As illustrated, the body 18 of the housing 16 supports one of the clamping jaws 12a, while the other of the clamping jaws 12b is supported by the movable arm 22.

The body 18 is assembled from various body components 24a and 24b as best identified in the exploded view of FIG. 4. In the particular form illustrated, the body component 24a is the larger of the body components and provides both the handle 20 and defines the majority of an internal cavity 26 for the reception of the operational components of a ratcheting mechanism for the movable arm 22 after the body component 24b (which resembles a generally flat cover plate) has been secured to the body component 24a. It should be appreciated that while two components are mainly described as the assembled body components, it should be appreciated that the illustrated embodiment is exemplary, but not limiting. For example, while the handle 20 is integrally and unitarily molded with the rest of body component 24a, that handle could alternatively be a separate component that might be affixed to the other body component. As still another example, while the body component 24b is illustrated as being generally plate-like, which creates a fair amount of asymmetry and differentiation between body components 24a and 24b, the body might instead be formed from two halves that are generally symmetrical and joined together at a medial seam.

As noted above, the internal cavity 26 of the body 18 is structured to receive a length of the movable arm 22 and supports a number of components for operation of the clamping mechanism by movement of the movable arm 22 which arm 22 supports the clamping jaw 12b. In the form illustrated, the movable arm 22 and the clamping jaw 12b can be linearly translated in the "A" direction (indicated by the "A" arrow in FIG. 1) by a one-way ratcheting mechanism 28 (best shown in FIGS. 6 through 8) toward the clamping jaw 12a supported by the body 18 of the housing 16. Similarly, the movable arm 22 can be released to travel in the reverse direction "B" (indicated by the "B" arrow in FIG. 1) by operation of a jaw release 30 after which the movable arm 22 can then be moved to separate the clamping jaws 12a and 12b from one another.

In terms of the structure of the movable arm 22 and with reference being made in particular to FIG. 4, the movable arm 22 includes a rail 32 which is a generally elongate beam or member. The rail 32 of the movable arm 22 is received through an arm-receiving passageway 34 of the body 18 of the housing 16 in which the arm-receiving passageway 34 extends parallel to the "A" and "B" directions. As the rail 32 of the movable arm 22 extends through the arm-receiving passageway 34, the rail 32 passes through the one-way ratcheting mechanism 28 and the jaw release 30. On one end 36a of the rail 32, a stop 38 is secured and, on the other end 36b of the rail 32, a clamp support 40 is secured. As a practical matter to facilitate assembly, one or both of the stop 38 and the clamp support 40 may not be affixed to the rail 32 until the rail 32 is already received in the arm-receiving passageway 34 of the body 18 of the housing 16 because otherwise the stop 38 or the clamp support 40 are so large as to prevent passage of those items through the arm-receiving passageway 34. In this regard, the stop 38 and the clamp support 40 also ensure that the movable arm 22 remains coupled to the body 18 and is not readily separatable therefrom.

The clamp support 40 of the movable arm 22 is adapted to receive a clamp pad 42b which, as illustrated, is screwed into the clamp support 40 using one or more fasteners. A corresponding clamp support 44 is part of the body 18 of the housing 16 (or directly attached thereto) and receives a clamp pad 42a which is also fastened into the clamp support 44. In the form illustrated, the clamp pads 42a and 42b include embedded gripping teeth, with the clamp pad 42b including a pair of rows of teeth and the clamp pad 42a having a single row of teeth. The rows of teeth are arranged and aligned such that, when the pads 42a and 42b are brought fully together, the single row of teeth on pad 42a would be positioned between the pair of rows of teeth on pad 42b. However, this is only one exemplary pad configuration and the pads 42a and 42b can be differently oriented or replaced with pads of other types, as will be described in greater detail below.

The body 18 of the housing 16 includes several components that form the one-way ratcheting mechanism 28 and jaw release 30 that engage and interact with the rail 32 of the movable arm 22.

Figure 6:
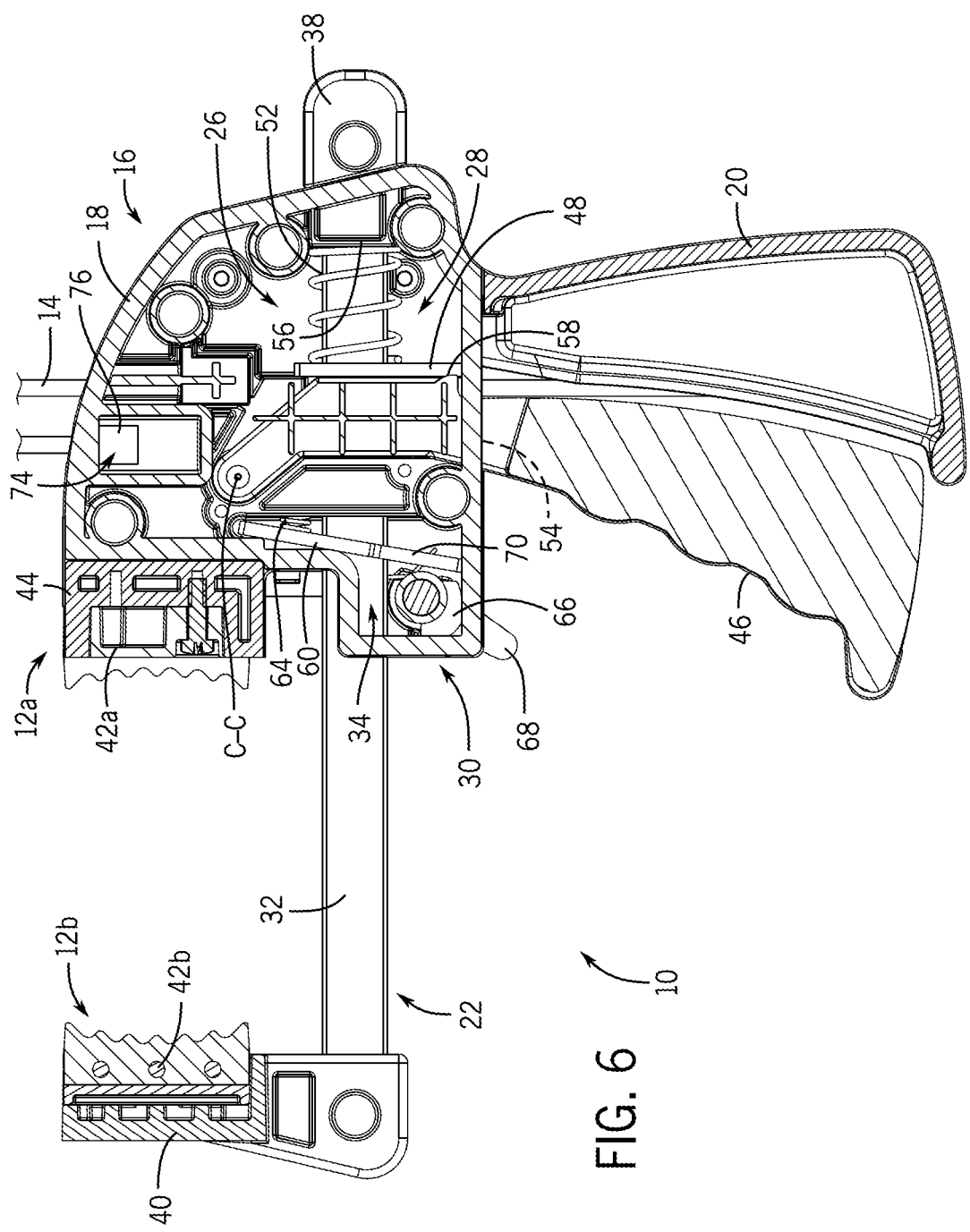
FIG. 6 is a right cross-sectional side view of the cable lockout device of FIG. 1 with the clamping jaws separated.

Looking first at the one-way ratcheting mechanism 28 and with reference being made in particular to FIG. 4 and FIGS. 6 through 8, the one-way ratcheting mechanism 28 includes a trigger 46 displaceable relative to the body 18 to effectuate a one-way ratcheting of the movable arm 22, an arm advancement plate 48 having an opening 50 through which the rail 32 of the movable arm 22 passes and selectively engages depending on the position of the arm advancement plate 48, and a biasing spring 52 that biases the arm advancement plate 48 to a non-engagement position with the rail 32 and that biases the trigger 46 to the resting position of FIG. 6. More specifically and with additional reference being had to FIGS. 6 and 7, the trigger 46 is pivotally mounted with respect to the housing 18 at axis C-C positioned inside the housing 18 and the trigger 46 extends out of a lower opening 54 at a bottom side of the body 18 of the housing 16, such that a user engageable portion of the trigger 46 is positioned adjacent to the handle 20. As best seen in FIG. 6, the biasing spring 52 engages both an interior surface 56 of the body 18 of the housing 16 and the arm advancement plate 48 to separate to two apart and, by virtue of the side of the arm advancement plate 48 opposite the side of the biasing spring 52 engaging a contacting surface 58 of the trigger 46, biases the trigger 46 toward the resting position as illustrated in FIG. 6. In the orientation illustrated in FIG. 6, this rotational biasing of the trigger 46 is in a clockwise direction with respect to the page and the trigger 46 can be urged rotationally into engagement with a portion of the lower opening 54 of the body 18 of the housing 16 through which the trigger 46 extends, which opening surface can operate as a rotational stop from the trigger 46 in the resting position.

Figure 7:
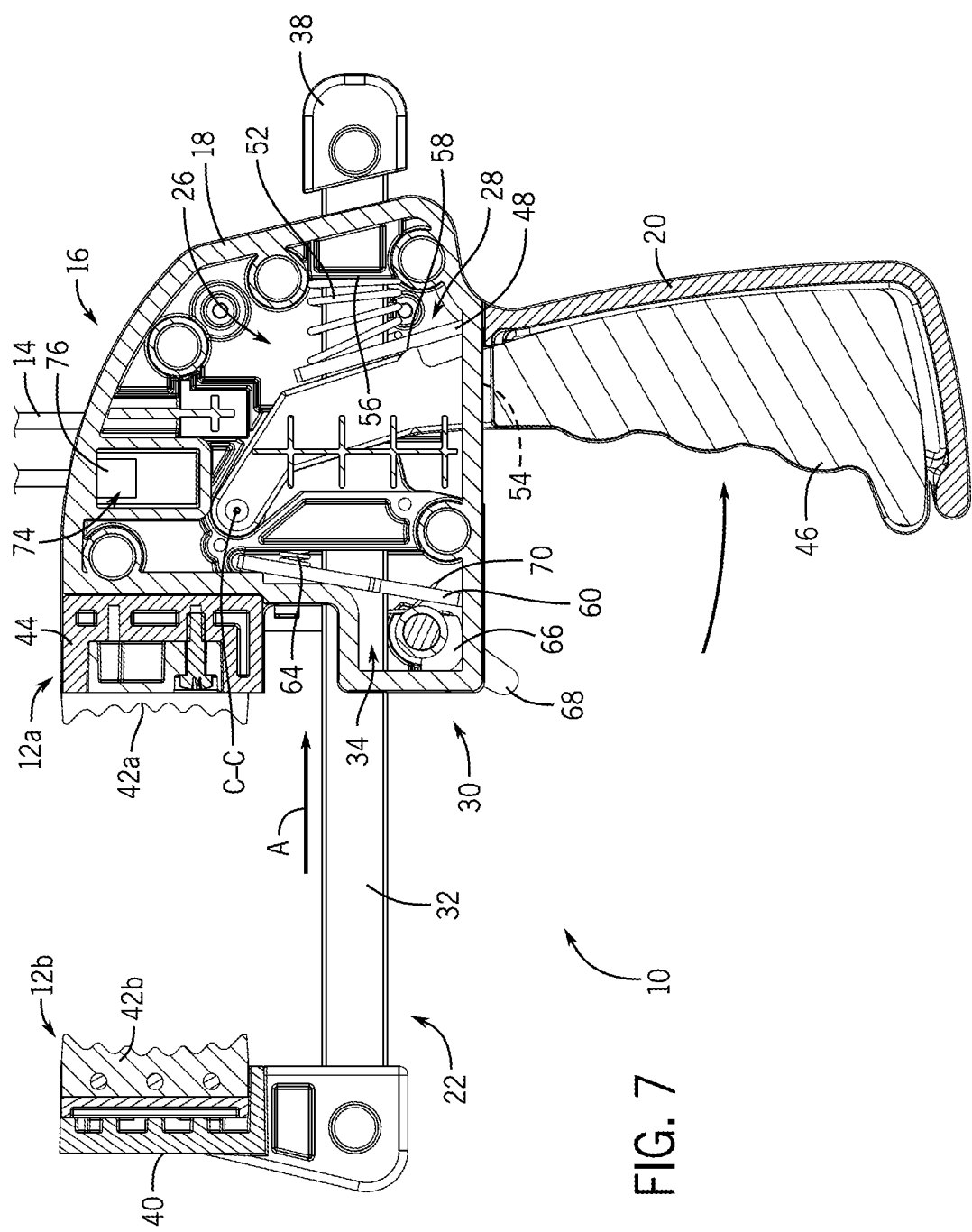
FIG. 7 is a right cross-sectional side view of the cable lockout device of FIG. 1 with the trigger depressed showing the advancement plate moving the arm to bring one of the jaws on the arm closer to the other jaw on the body.

In operation, when the trigger 46 is depressed, the one-way ratcheting mechanism 28 is operated to move the movable arm 22 rightward relative to the orientations depicted in FIGS. 6 and 7 such that the clamping jaws 12a and 12b are brought closer together by the movement of the movable arm 22 relative to the body 18. With reference being made to FIG. 7, the depression of the trigger 46 when a user squeezes the trigger 46 relative to the handle 20 causes the counter-clockwise rotation (relative to the orientation on the page in FIGS. 6 and 7) of the trigger 46 about axis C-C, such that the contacting surface 58 of the trigger 46 pushes the arm advancement plate 48 rightward and upward against the biasing force of the biasing spring 52. In so doing, the contacting surface 58 of the trigger 46, which is initially generally perpendicular to the orientation of the rail 32 initially, rotates slightly in the counter-clockwise direction which has the effect of causing a similar rotation of the arm advancement plate 48 relative to the rail 32 such that the plate 48 lifts and the lower end of the opening 50 of the plate 48 can snag and carry the rail 32 to draw the rail 32 (and thereby the movable arm 22 of which the rail 32 forms a part) rightward on the page. This movement has the effect of closing or bringing together the clamping jaws 12a and 12b in a small increment. In other words, this movement has the effect of moving the clamping jaw 12b a distance in the "A" direction, towards the clamping jaw 12a.

When the trigger 48 is released, the biasing spring 52 pushes the arm advancement plate 48 back to a non-engagement position with the rail 32 and the trigger 46 back to the rest position of FIG. 6. However, upon release of the trigger 46, the movable arm 22 does not return in the direction from which it came (that is, leftward relative to the orientation in FIGS. 6 and 7). Rather, the arm advancement plate 48 returns back to a non-engagement position without the opening 50 pulling the rail 32 back with it. The jaw release 30, which will be described in greater detail below, can prevent the reverse movement of the movable arm 22 and the return path of travel of the arm advancement plate 48 may be such that there is little to no snagging of the opening 50 on the rail 32 over the return.

Accordingly, the repeated actuation or pumping of the trigger 46 (that is, depression of the trigger 46 relative to the handle 22 and then release of the trigger 46) can cause the incremental one-way ratcheting of the movable arm 22 relative to the body 18 of the housing to draw the pair of clamping jaws 12a and 12b closer to one another.

With reference to FIGS. 1 through 4 and 7 through 8, the structure and operation of the jaw release 30 will now be described in greater detail. This jaw release 30 acts in cooperation with the one-way ratcheting mechanism 28 described above to either support or maintain the one-way ratcheting of the movable arm 22 relative to the body 18 or to permit the movable arm 22 to be released against or freed from that ratcheting action depending on the state of the jaw release 30.

In the form illustrated, the jaw release 30 includes a jaw release plate 60 having an opening 62 (as best illustrated in FIG. 4), a biasing spring 64 for the upper end of the jaw release plate 60, a rotatable cam 66 attached to a cam lever 68 in which the cam 66 is engageable with the jaw release plate 60, and a biasing spring 70 for the rotatable cam 66.

In terms of structure and construction, the rail 32 of the movable arm 22 is received through the opening 62 of the jaw release plate 60 with the jaw release plate 60 being received within and rotationally constrained by the body 18 of the housing 16. In the rest position of the jaw release 30 (that is, without the rotatable cam 66 having been actuated), the jaw release plate 60 is obliquely angled by the biasing spring 64 with respect to the direction of movement and extension of the rail 32. See, for example, the positioning of the jaw release plate 60 in FIGS. 6 and 7 and the biasing spring 64 pushing or urging the upper end of the jaw release plate 60 into a pair of contact points leftward of the jaw release plate 60 that results in the angling of the jaw release plate 60. In this rest position of the jaw release plate 60, the rail 32 can be advanced by the operation of the trigger 46 (as illustrated in FIGS. 6 and 7, moving rightward relative to the page) and the rail 32 is able to pass through the opening 62 of the jaw release plate 60 without appreciable resistance. However, with the jaw release plate 60 in the angular position of FIGS. 6 and 7, the rail 32 and therefore the moving arm 22 are unable to move leftward relative to the orientation of the device 10 on the page in these figures, as the engagement of the rail 32 with the opening 62 of the jaw release plate 60 would tend to push the jaw release plate 60 counter-clockwise from its upper end, but which motion is not possible from the top end based on how the jaw release plate 60 is seated in the body 18 of the housing 16.

Figure 8:
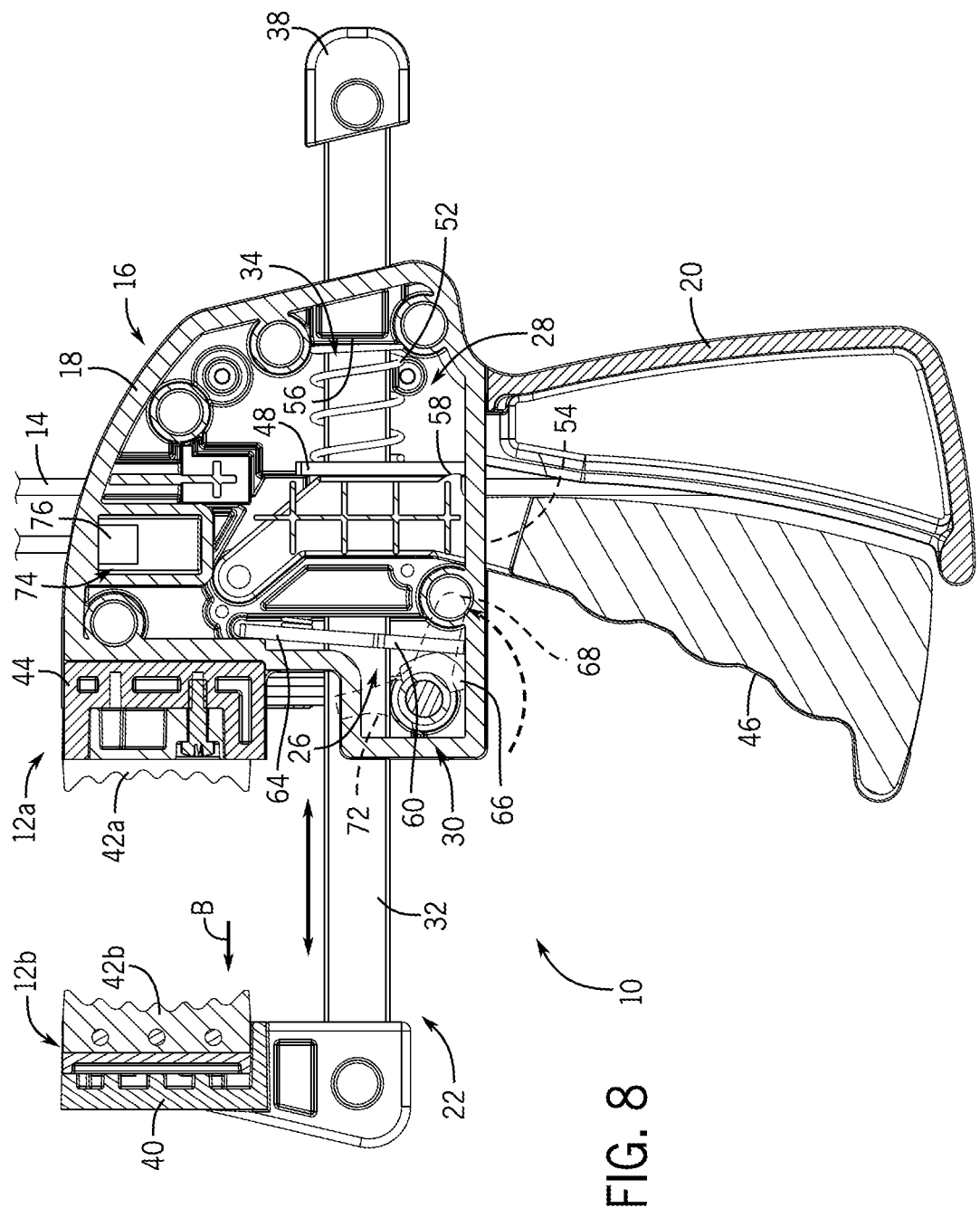
FIG. 8 is a right cross-sectional side view of the cable lockout device of FIG. 1 in which the cam lever and rotatable cam have been rotated to move the jaw release plate. Although not seen in this view, a lockable cover of the cable securing mechanism is open such that the jaw release plate is rotatable and not blocked from operation by a blocking arm of the lockable cover.

However, a rotatable cam 66 is able to rotate the lower end of the jaw release plate 60 to a release position, shown in FIG. 8, in which the rail 32 and movable arm 22 are able to move leftward on the page relative to the orientation in FIGS. 6 through 8, thereby permitting separation of the clamping jaws 12a and 12b. As constructed, this rotatable cam 66 is positioned internally in the housing 16 of the body 18 adjacent to a lower end of the jaw release plate 60 and is biased clockwise (relative to the orientation of FIGS. 6 and 7) by the biasing spring 70, which spring 70 is a torsional spring so that, in the rest position, the cam surface of the rotatable cam 66 does not displace the jaw release plate 60 from its rest position. However, the rotatable cam 66 is attached to the cam lever 68 (which is accessible from the exterior of the housing 16) and the rotation of the cam lever 68 can effectuate the counter-clockwise rotation (again, relative to the view orientation of FIGS. 6 through 8) of the rotatable cam 66 to bring the cam surface into engagement with the lower end of the jaw release lever 60 such that the jaw release lever 60 is rotated in a counter-clockwise direction from its bottom end (again, relative to the view orientation of FIGS. 6 through 8) and slightly against the biasing force of the biasing spring 64 which tends to oppose that rotation as depicted in FIG. 8. When so rotated and effectuated, the jaw release plate 60 and its opening 62 are adjusted relative to the rail 32 such that the rail 32 can pass leftward through the jaw release plate 60 and the one-way ratcheting constraint provided by the jaw release 30 is reversed temporarily.

Notably, and will be described in greater detail below, while the cam lever 68 is accessible from the exterior of the body 18 of the housing 16 such that it can be rotated from the rest position as in FIGS. 6 and 7 against the biasing force to effectuate the jaw release 30 as in FIG. 8, the jaw release 30 (and the cam lever 68, specifically) may not always be readily rotated by the user to perform this function. Namely, the cam lever 68 also has a projection 72 which rotates with the cam lever 68 and is angularly offset from the cam lever 68 itself which projection 72, under certain states or conditions of the device 10, can mechanically block the rotation of the cam lever 68 by engagement with another feature (blocking arm 114), as will be described in greater detail below with respect to FIGS. 10 and 11.

B. Cable Looping Mechanism

In addition to the above-described clamping mechanism, the present clamping cable lockout device has a cable looping mechanism. With general reference being made to FIGS. 1 and 4, the cable 14 has a length extending from an end 74 with a stop 76 securable to the body 18 of the housing 16 and a free end 78. In the particular form illustrated, to secure the cable to the body on the end 74 with the stop 76, the free end 78 can be inserted through an opening 80 on the housing 16 which is large enough that the free end 78 of the cable 14 can pass through the opening 80, but small enough that the stop 76 on the end 74 cannot pass through the opening 80, such that the stop 76 anchors that end 74 of the cable 14 to the housing 16. As will be described below, the free end 78 of the cable 14 can be separately secured by a user to a cable securing mechanism 82. However, when the free end 78 of the cable 14 is not secured, the cable 14 might be pulled from the end 74 having the stop 76 such that the stop 76 is pulled away opening 80 in the housing 16 and the cable 14 is removable in that state from the device 10. This permits the cable 14 to be replaced with another cable for any one of several reasons (such as, for example, cable wear, replacing the cable with a cable of a different diameter or material, and so on).

Regardless, with the end 74 of the cable 14 secured to the body 18 of the housing 16, the free end 78 of the cable 14 is selectively receivable by the cable securing mechanism 82 to form a closed loop (as shown in FIG. 1). With additional reference being made to FIGS. 4, 5, and 9 through 11, in the embodiment illustrated the cable securing mechanism 82 is a box 84 with a lockable cover 86 which is attached to the lateral side of the body 18 of the housing 16. However, it is contemplated that the cable securing mechanism 80 could be attached in different locations than that illustrated or integrated into the other parts of the device (that is, formed in the side of the housing, the handle or so forth) or otherwise differently structured while providing similar functionality to that which is described herein.

Perhaps as best seen in a comparison of FIGS. 1 and 2, the cable securing mechanism 82 includes the box 84 with the lockable cover 86, which cover 86 is shown closed in FIG. 1 and opened in FIG. 2. As illustrated, the cover 86 is hinged at one side of the cover 86 to the sidewall of the box 84 and is adapted to be selectively secured with one or more locks on the side of the cover 86 opposite the hinged side. The hinge 88 in this structure is integrated into the side wall of the box 84 and the edge of the cover 86, with the edge of the cover 86 having an outwardly-facing C-shaped hinge part 90a and the corresponding edge of the box 84 having a bar or rod 90b into which the C-shaped hinge part 90a is received to establish the axis of rotation for the hinge 88. On the other side of the cover, there is a slot 92 and the box 84 has a wall 94 that extends away from the body 18 through which the slot 92 is receivable when the cover 86 is closed. That wall 94 has a set of lock receiving openings 96 which are sized to receive shackles of padlocks or other locking elements to secure the cover 86 in the closed position relative to the box 84 (see e.g., FIG. 11) such that the cover 86 cannot be opened until the lock(s) are removed.

The box 84 houses a pair of cleats 98a and 98b which are general oval or elongated having a pair of tips with textured surfaces that are biased towards one another and adapted for griping the cable 14. The cleats 98a and 98b are seated on a pair of posts 100a and 110b in the base wall of the box 84 are rotationally counter biased towards one another by a pair of corresponding biasing springs 102a and 102b which are torsion springs. While the tips of the cleats 98a and 98b can be separated from one another, they are urged to be brought back together by the applied biasing force from the springs 102a and 102b. In at least some forms, the cleats 98a and 98b can be secured to the posts 100a and 100b by fasteners in a way that axially retains the cleats 98a and 98b in place but permits their rotation. Moreover, the arms of the springs 102a and 102b may seat in portions of the cleats 98a and 98b and adjacent base wall to provide the rotational biasing force on the cleats 98a and 98b and there may be projections on the cleats 98a and 98b and tracks in the adjacent base wall to define the range of rotational motion of the cleats 98a and 98b.

To permit the selective securing of a cable 12 by the cleats 98a and 98b, a cable pathway 104 extends through the cable securing mechanism 82. The cable pathway 104 extends from an entrance opening 106 formed in and/or by the sidewall of the box 84 and/or cover 86, through the space 108 between the pair of cleats 98a and 98b, and out an exit opening 110 formed in and/or by the opposing sidewall of the box 84 and/or cover 86.

Figure 9:
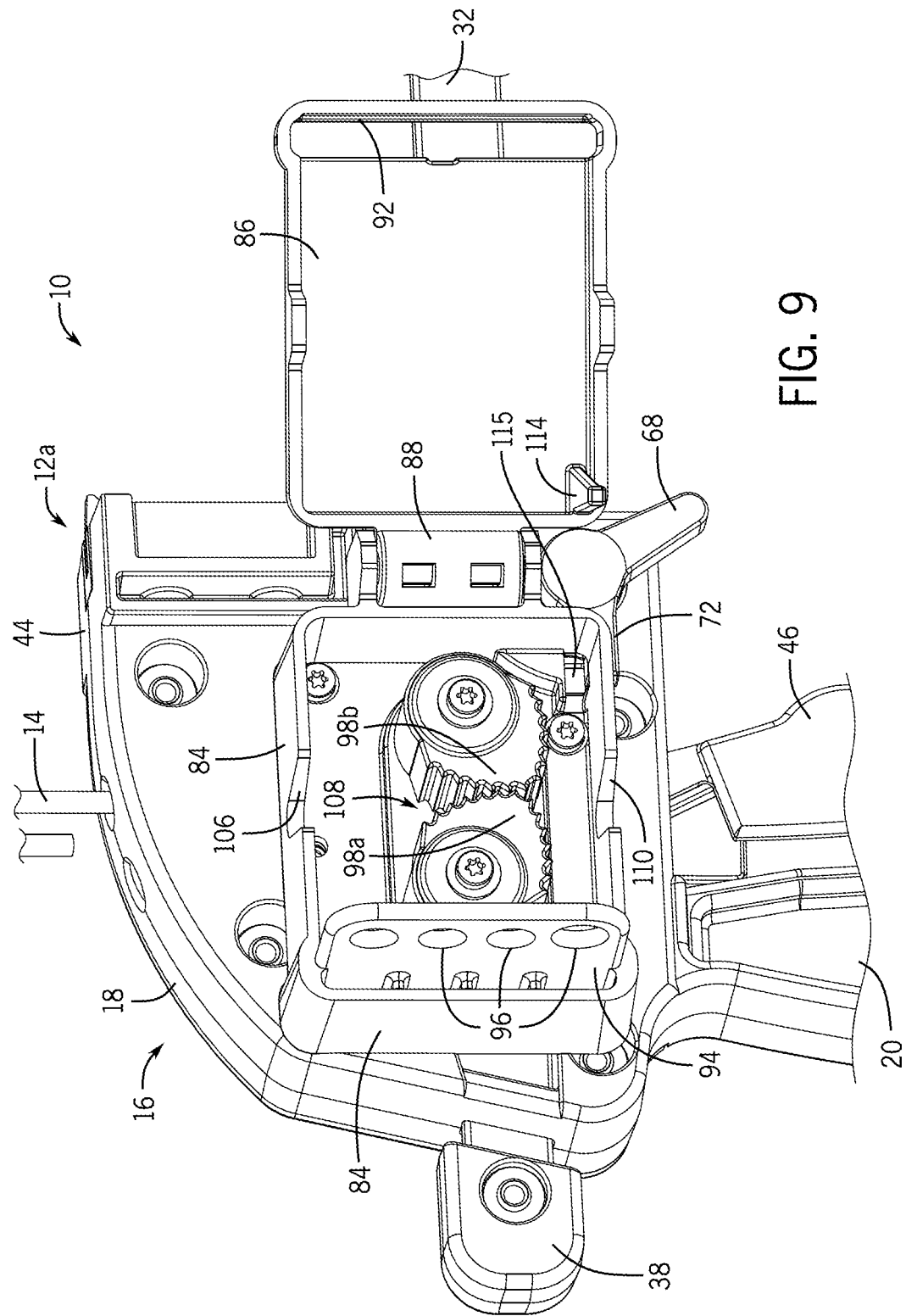
FIG. 9 is a detailed perspective view of the opened cable securing mechanism of the cable lockout device of FIG. 1 in which the cable is not received between the cleats and the blocking arm on the lockable cover is shown cleared from the cam lever, such that the cam lever could be potentially operated to permit release or separation of the clamping jaws.
Figure 10:
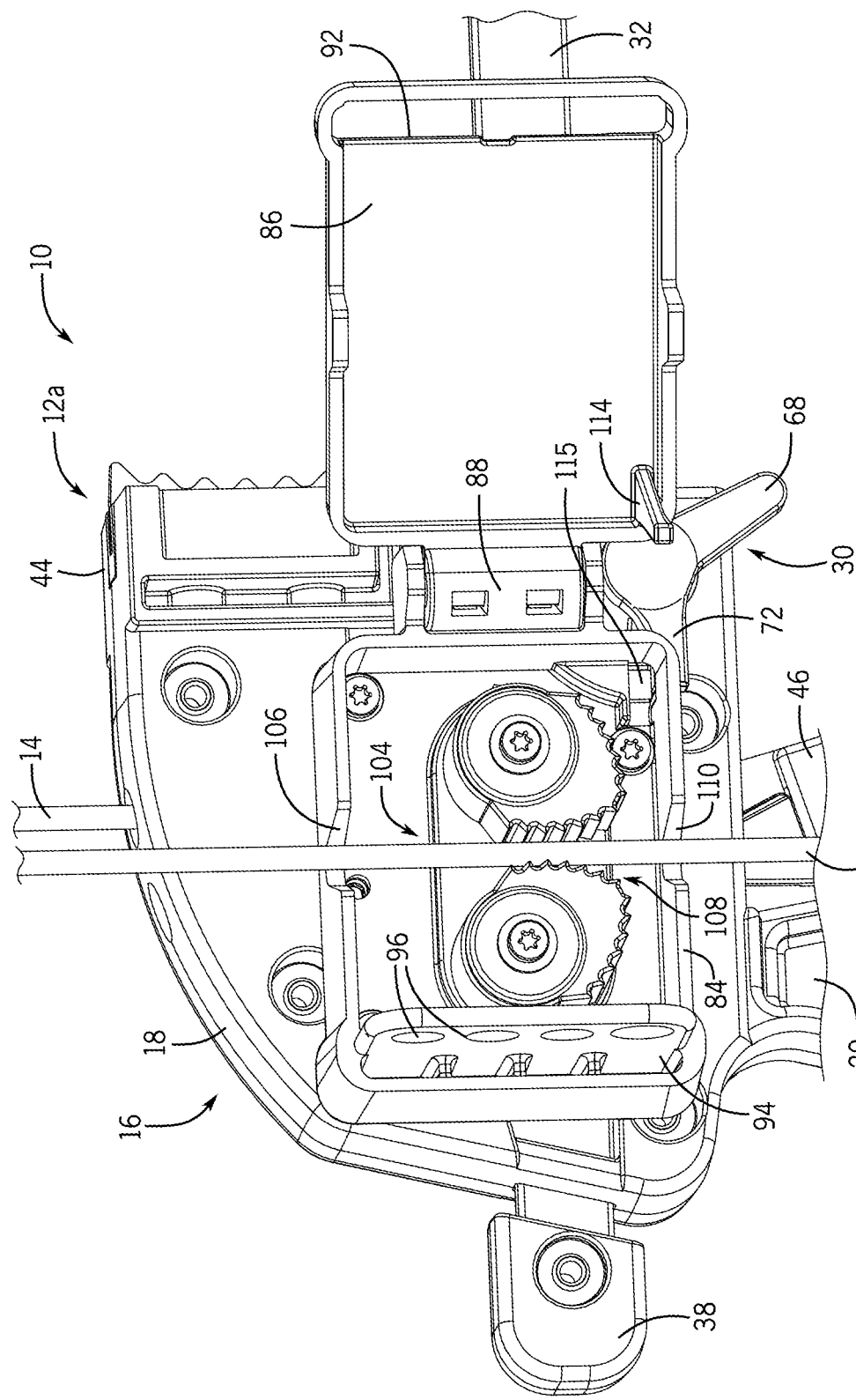
FIG. 10 is a detailed perspective view of the opened cable securing mechanism of the cable lockout device of FIG. 9 in which the cable is received between the cleats.
Figure 11:
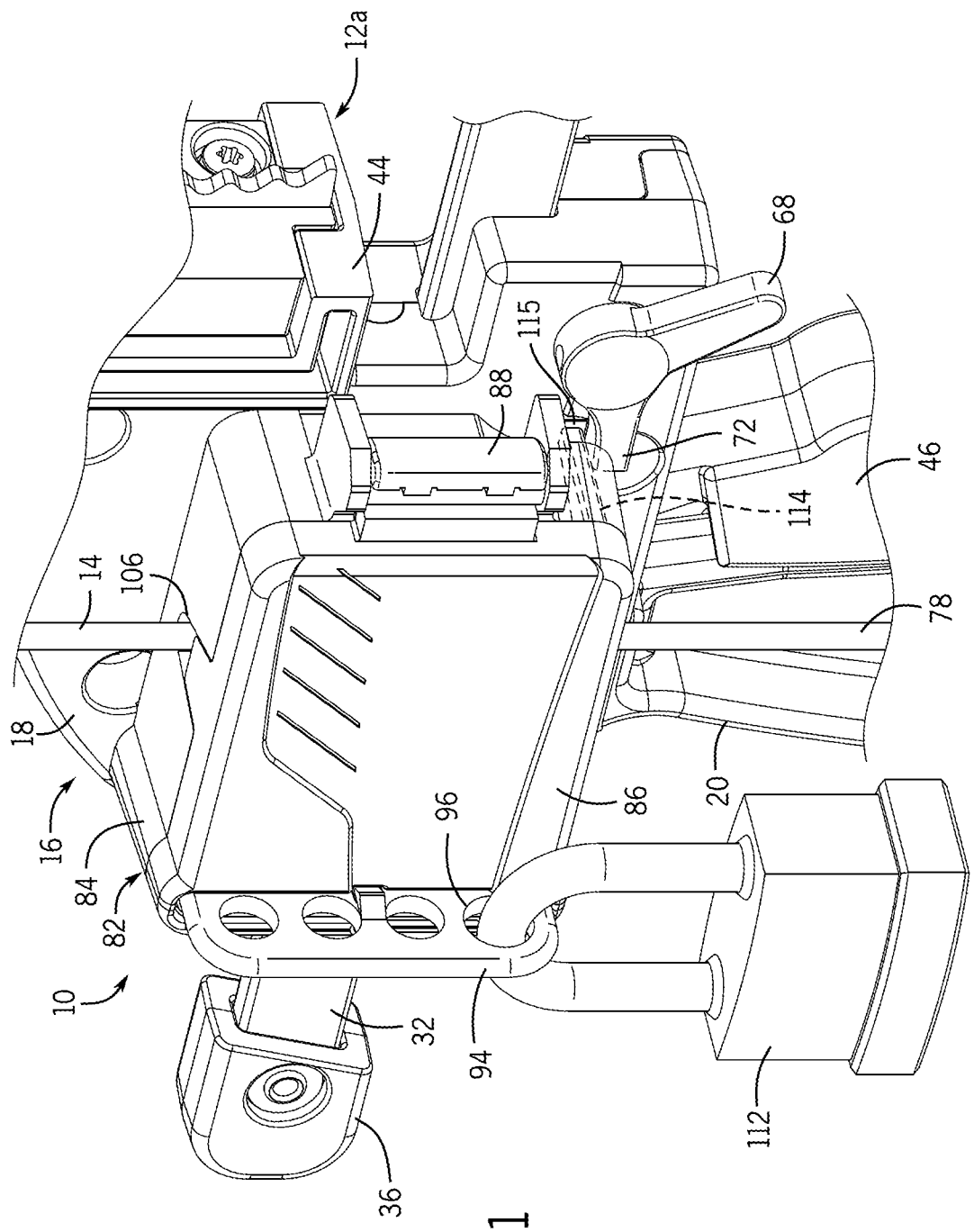
FIG. 11 is detailed perspective view of the cable securing mechanism of the cable lockout device in which the cable is received between the cleats as shown in FIG. 10 but with the cover closed and with a lock attached through one of the openings, such that the blocking arm on the secured cover prevents the release cam lever for the clamps from being operated.

In operation of the cable securing mechanism 82, the lockable cover 86 is first placed in an opened position with respect to the box 84 such as is shown in FIGS. 2 and 9. In this position, the free end 78 of the cable 14 is inserted by the user through the cable pathway 104 as depicted in FIG. 10 and, more specifically, the cable 14 is run between the space 108 between the cleats 98a and 98b. With portions of the free end 78 of the cable 14 also being positioned as going through the entrance opening 106 and the exit opening 110, the lockable cover 86 can then be closed with respect to the box 84 and secured using one or more padlocks 112 as depicted in FIG. 11 that are received in the lock-receiving openings 96. With the cable 14 running between the cleats 98a and 98b and the cover 86 secured closed, the free end 78 of the cable 14 can be further pulled out of the exit opening 110 to further reduce the size of the closed loop formed between the secured end 74 of the cable 14 at the opening 80 of the housing 16 and the point at which the cable 14 is received at the entrance opening 106 of the cable securing mechanism 82. Because of the configuration of the cleats 98a and 98b, the cable 14 is able to pass through the cleats 98a and 98b when pulled out the exit opening 110 as the tips of the cleats 98a and 98b can simply rotate slightly apart as the cable 14 is pulled in that direction. However, because of the configuration of the cleats 98a and 98b, the cable 14 cannot be pulled in the opposite direction out of the entrance opening 106. This is because the tips of the cleats 98a and 98b will be pulled inward into the cable pathway 104, dig into the cable 14 and prevent the cable 14 from being pulled in that direction. Accordingly, with this structure and the cover 86 secured closed, a closed loop can be reduced in size by pulling the free end 78 of the cable 14, but not enlarged. Not until the padlock(s) 112 are removed and the lockable cover 86 is open can the cable 14 be removed or withdrawn from the space 108 between the cleats 98a and 98b by the user by pulling the cable 14 out of the cable pathway 104 and apart from the cleats 98a and 98b altogether. That action would break the closed loop and permit the free end 78 of the cable 14 to be reset within the cable securement mechanism 82.

It will be appreciated that the depicted cable securing mechanism 82 is representative but that variations to this design are certainly contemplated as falling within the scope of this disclosure. For instance, while a pair of cleats are illustrated, other one-way gripping mechanisms could be employed instead. For example, there could be one cleat that pivots into another flat immobile surface. As another example, the cleat(s) may not pivot as illustrated but create a pinching action in one direction in other ways (for example, angled linear translation of a gripping element or elements "that" bite the cable when pulled in one direction but not the other). Still further, any or all of the lockable cover 86, box 84, hinge 88 and/or securing mechanism for locking the cover 86 in place so as to prevent the cable 14 from being withdrawn from the cable securing mechanism 82 could be modified while still achieving the same basic results apparent from the description above.

A nonlimiting example of a suitable cable 14 is a nylon and/or polyvinyl chloride (PVC) coated steel cable. It will be appreciated that while the figures depict a cable 14 with a stop 76 securable to the body 18 of the housing 16, the cable 14 end 74 could alternatively be fastened (such as with a screw), or otherwise connected to the body 18 of the housing 16.

C. Blocking Arm

Notably and with reference being had to FIGS. 9 through 11, attention is drawn to a unique feature of the lockable cover 86 which also can prevent the operation of the jaw release 30 of the clamping mechanism. Perhaps best seen in FIGS. 9 and 10, the lockable cover 86 includes a blocking arm 114 which blocking arm 114 projects backwards from the face of the cover 86 that will face the cleats 98a and 98b when the cover is closed. That blocking arm 114 is situated to be in a position in which that blocking arm 114 will interfere with the operation of the rotatable cam 66 by virtue of preventing the rotation of the cam lever 68 when the cover 86 is closed. As illustrated, the blocking arm 114 is located a lower corner of the lockable cover 86 on the edge of the cover 86 having the hinge 88 such that it is very closely positioned with respect to the cam lever 68 and the projection 72 of the cam lever 68. And the corner of the box 84 includes a cutout 115 through which the blocking arm 114 can be received in the closed position and through which the projection 72 would attempt to rotate when the cam lever 68 is operated by the user In the position illustrated in FIG. 9, with the lockable cover 86 open, the blocking arm 114 is free of any engagement with the cam lever 68 and its associated projection 72. This means that with the lockable cover 86 open, both the cable 14 is potentially insertable and removable from the cable securing mechanism 82 and additionally the jaw release 30 is operational. Accordingly, when the cover 86 is open, this permits both for the clamps 12a and 12b to be separable upon operation of the jaw release 30 and for any cable loop to be broken by virtue of the cable 14 being removable from the cable securing mechanism 82.

However, when the lockable cover 86 is closed as illustrated in FIG. 11, then the cover 86 prevents the removal of the cable 14 from the cable securing mechanism 82 (assuming the cable 14 is inserted) and further positions the blocking arm 114 of the cover 86 to be directed in towards the body 18 and through the cutout 115 into the volume into which the projection 72 of the cam lever 68 would need to rotate for the jaw release 30 to be operated. As the cable 14 cannot be removed from the cable securing mechanism 82 with the cover 86 closed, on the basis of the description above, this permits any formed closed loop to only be reduced in size, and not expanded or broken, so long as the cover 86 remains closed. Still further, as the blocking arm 114 prevents operation of the jaw release 30 (and the cam lever 68 specifically by blocking the projection 72), the clamping jaws 12a and 12b can only be incrementally brought together by the one-way ratcheting if the trigger 46 is pumped until the cover 86 is opened. Again, since the cover 86 is lockable using the one or more padlocks 112, when the cover 86 is closed, this cover 86 does not permit the reversal of two different securing mechanisms (that is, the clamping and the cable looping mechanisms) and a unitary securement point is formed.

Thus, when used by a user, the clamps 12a and 12b can be secured to an object and the cable 14 looped through a structure to secure a control or the like from being operated. So long as the cover 86 is closed and secured, neither of the clamping or cable securement mechanisms can be reversed to remove the lockout device 10. Although it is contemplated that both the clamping mechanism and the loop forming mechanisms may be used simultaneously to provide unique utility, it is also possible that just one of the two mechanisms could be used at a time depending on the particular use content of the lockout device 10.

The blocking arm 114 and the cover 86 may have an integral design or a composite design. A structure having an "integral design" is a component formed from one piece of material, such as a molded piece. A structure having a "composite design" is a component formed from more than one distinct piece (or part), which upon assembly are combined. FIG. 9 depicts a blocking arm 114 and cover 86 with an integral design.

In an embodiment, a user may utilize the present clamping cable lockout device to lock the handle of a valve control (such as a quarter-turn ball valve handle, a butterfly handle, a gate valve handle, a three-way valve handle, a four-way valve handle, a five-way valve handle, a T-handle, or a ring handle), thereby preventing the handle from being inadvertently moved. In one embodiment, a user may first utilize the clamping mechanism with the handle of the valve control positioned between the opposing clamp jaws 12a and 12b, operating the one-way ratcheting mechanism 28 to bring both clamp jaws 12a and 12b into contact with the handle of the valve control, thereby connecting the clamping cable lockout device to the handle of the valve control. The structure of the clamping cable lockout device may then impede movement of the handle of the valve control in one or more directions. Then, the user may second utilize the cable looping mechanism to form a closed loop around a fixed structure (e.g., a pipe or a beam), thereby impeding movement of the handle of the valve control in one or more directions. In some embodiments, the structure of the clamping cable lockout device impedes movement of the handle of the valve control in a first direction, and the closed loop impedes movement of the handle of the valve control in an opposing second direction. Once the cover 86 is secured, the closed loop can only be reduced in size and the blocking arm 114 prevents the jaw release 30 from operating, thereby preventing the handle of the valve control from being inadvertently moved.

D. Clamp Pads

Figure 12A:
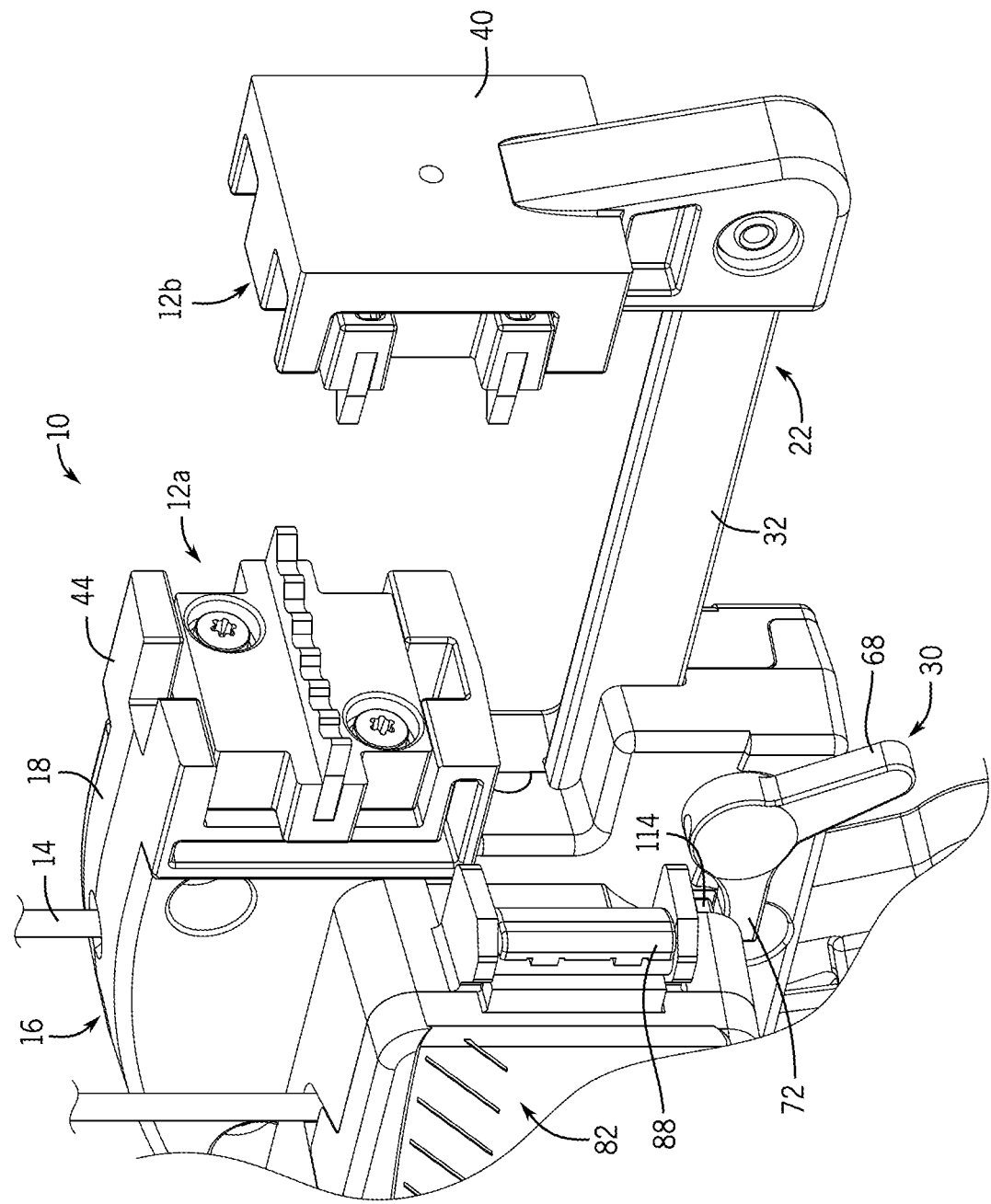
FIGS. 12A and 12B are a perspective view of the cable lockout device of FIG. 1-11, but in which the jaw pads have been removed and rotated 90 degrees to provide a different orientation of the jaws.
Figure 12B:
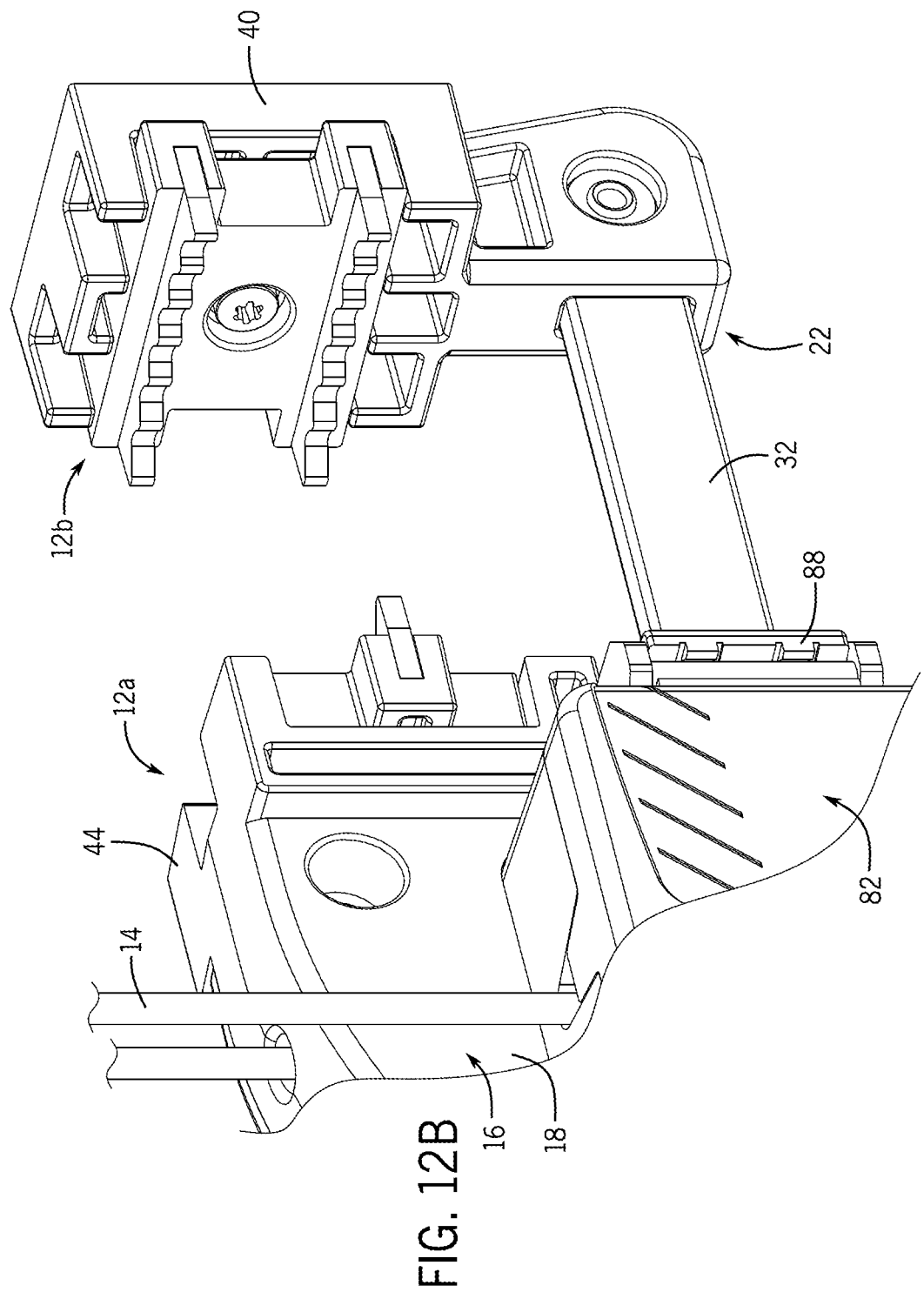
Figure 13A:
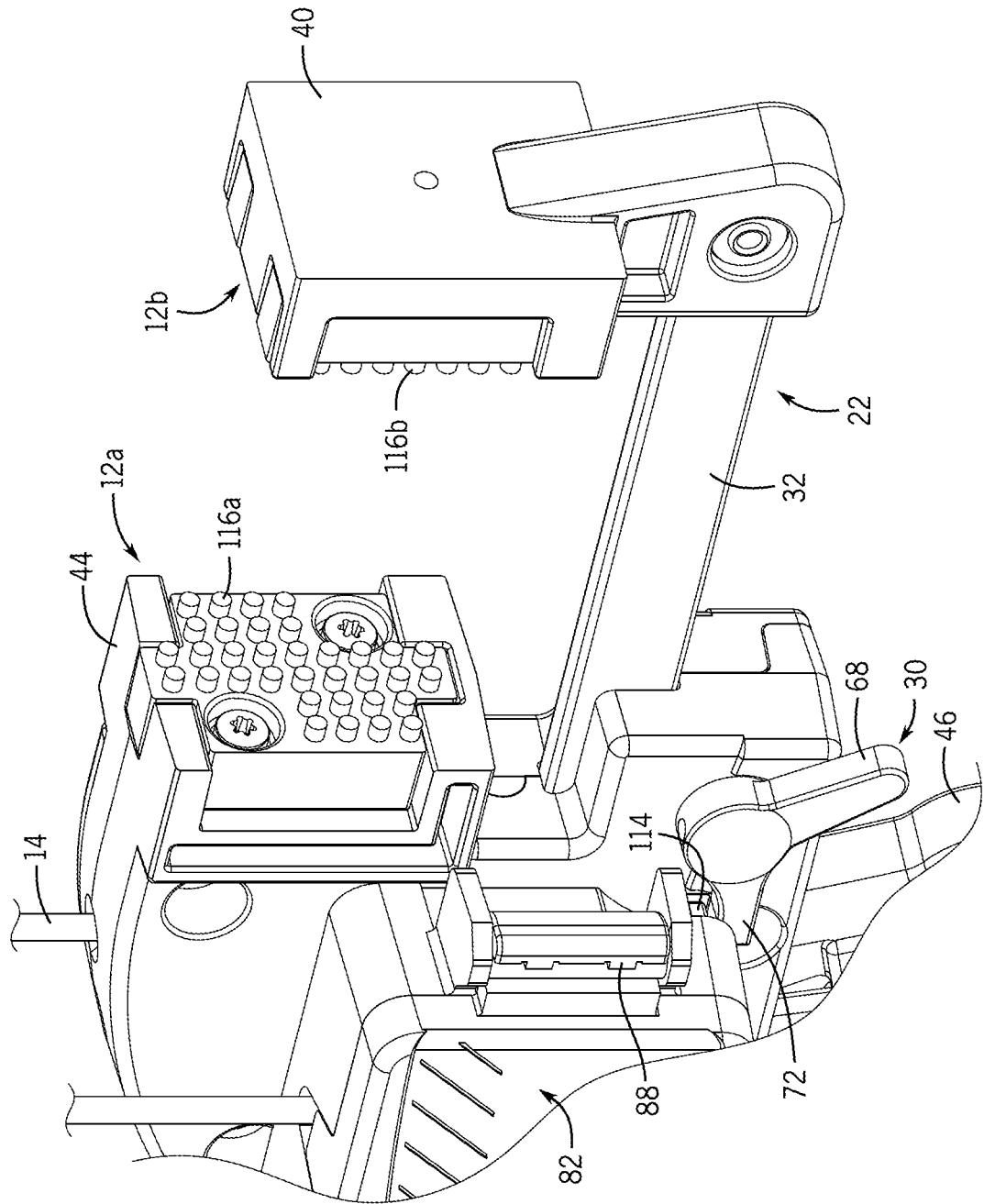

Finally, turning to FIGS. 12A, 12B, 13A, and 13B, it is illustrated that the clamp pads 42a and 42b can potentially be rotated as shown in FIGS. 12A and 12B, in which the teeth are rotated 90 degrees from their orientation in the other figures (for example, compare to FIGS. 1 and 2 to FIGS. 12A and 12B) or in which, as in FIGS. 13A and 13B, the clamp pads 42a and 42b can be removed and replaced with alternative clamp pads 116a or 116b which are textured polymeric (specifically, elastomeric) pads having, for example no teeth embedded therein.

Nonlimiting examples of suitable clamp pads include metal pads, polymeric pads, and combinations thereof. Nonlimiting examples of suitable polymeric pads include thermoplastic pads, thermoset pads, elastomeric pads, and combinations thereof. A nonlimiting example of a suitable elastomeric pad is a rubber pad. From this, those having ordinary skill in the art will appreciate that the clamp pads can be replaced and/or differently mounted such that the lockout device 10 can be adapted for various use situations.

It will be appreciated that while the depicted clamp pads 42a and 42b (as well as 116a and 116b) are depicted as being screwed into the clamp supports 40 and 44, different types of fasteners may be utilized (e.g., snaps, hook and loop, brackets, etc.).

In some forms, the clamp pads 42a and 42b are metal pads having teeth. In a further embodiment, the metal teeth may be coated in a polymeric material, such as an elastomeric material.

As noted above, it should be appreciated that various other modifications and variations to the preferred embodiments can be made within the spirit and scope of the invention. Therefore, the invention should not be limited to the described embodiments. To ascertain the full scope of the invention, the following claims should be referenced.

What is claimed is:

1. A clamping cable lockout device comprising:
   a housing including a body;
   a moveable arm that is movable relative to the body of the housing;
   a pair of clamp jaws supported by the body and the movable arm, the pair of clamp jaws being positionable with respect to one another to define a distance therebetween;
   a jaw release that permits a one-way ratcheting of the moveable arm relative to the body to reduce the distance between the pair of clamp jaws unless the jaw release is actuated to a release position in which the pair of clamp jaws are separable from one another;
   a cable having an end secured to the body and a free end;
   a cable securing mechanism supported by the body and having a lockable cover selectively permitting access thereto such that, when the cable securing mechanism receives the free end of the cable and when the cover is closed, a closed loop is formed between the end of the cable secured to the body and free end of the cable received in the cable securing mechanism, the free end being further moveable in the cable securing mechanism only in one direction to make the closed loop smaller while the cover is closed;
   wherein the lockable cover has a blocking arm that, when lockable cover is in the closed position, prevents actuation of the jaw release to the release position in which the pair of clamp jaws are separable from one another.

2. The clamping cable lockout device of claim 1, wherein the jaw release includes a rotatable cam that, when rotated to actuate the jaw release to the release position, engages a jaw release plate that rotates within the body of the housing to permit the movable arm to travel in a direction in which the pair of clamp jaws are separable from one another.

3. The clamping cable lockout device of claim 2, wherein the rotatable cam and the jaw release plate are both received inside the housing and the jaw release further includes a cam lever attached to the rotatable cam in which the cam lever is external to the housing.

4. The clamping cable lockout device of claim 3, wherein the cam lever includes a projection extending therefrom and the blocking arm is positioned to block the projection, and thereby the cam lever, from rotating when the lockable cover is closed.

5. The clamping cable lockout device of claim 3, wherein the lockable cover is hinged relative to the body of the housing on the side of the cable securing mechanism proximate the cam lever.

6. The clamping cable lockout device of claim 1, wherein the jaw release is biased away from the release position.

7. The clamping cable lockout device of claim 1, wherein the cable securing mechanism includes a set of lock receiving openings configured to receive one or more locks in which, when the lockable cover is in the closed position and the one or more of the set of lock receiving openings receive the one or more locks, the lockable cover is not able to be moved away from the closed position, thereby maintaining the blocking arm of the cover in a position that prevents the jaw release from being moved to the release position and further that prevents the cable to be disengaged from the cable securing mechanism to break the closed loop of the cable and that prevents the closed loop from being enlarged.

8. The clamping cable lockout device of claim 7, wherein the set of lock receiving openings are received on a wall that extends away from the body, wherein the lockable cover includes a slot, and wherein the wall providing the set of lock receiving openings is received through the slot of the lockable cover when the lockable cover is closed such that a lock placed through one of the set of lock receiving openings would prevent the lockable cover from being moved out of the closed position.

9. The clamping cable lockout device of claim 1, wherein a cable pathway extends through the cable securing mechanism and the cable securing mechanism includes at least one cleat biased to engage the cable when the cable is received through the cable pathway.

10. The clamping cable lockout device of claim 9, wherein the cable pathway extends between a pair of cleats including the at least one cleat biased to engage the cable when the cable is received through the cable pathway.

11. The clamping cable lockout device of claim 1, wherein the body of the housing includes a handle and wherein the clamping cable lockout device further comprises a trigger displaceable relative to the body to effectuate the one-way ratcheting of the moveable arm relative to the body to draw the pair of clamping jaws closer to one another.

12. The clamping cable lockout device of claim 11, wherein the trigger engages an arm advancement plate when the trigger is displaced in which the movable arm advancement plate engages the arm as the trigger is depressed to effectuate the one-way ratcheting of the moveable arm relative to the body.

13. The clamping cable lockout device of claim 12, wherein a movement of the arm advancement plate when the trigger is displaced is made against a force of a biasing spring which force of the biasing spring returns the arm advancement plate after the trigger is released.

14. The clamping cable lockout device of claim 1, wherein the end of the cable secured to the body is secured by way of a stop secured to the end of the cable engaging a cable opening in the housing undersized relative to the size of the stop in which the cable opening is large enough that the free end of the cable can pass through the cable opening and small enough that the stop secured to the end of the cable cannot pass through the cable opening.

15. The clamping cable lockout device of claim 14, wherein, by moving the end of the cable having the stop away from the cable opening of the housing, the free end of the cable is capable of being pulled out of the cable opening in the housing and replaced with another cable.

16. The clamping cable lockout device of claim 1, wherein one of the pair of clamping jaws is mounted to the body and the other one of the pair of clamping jaws is mounted to the movable arm.

17. The clamping cable lockout device of claim 16, wherein the pair of clamping jaws include clamping pads that are removable from the body and the arm.

18. The clamping cable lockout device of claim 17, wherein the clamping pads are selected from a group of pads including an elastomeric pad and a pad having teeth.

* * * * *